(12) United States Patent
Flannery et al.

(10) Patent No.: US 11,194,333 B2
(45) Date of Patent: Dec. 7, 2021

(54) LIFT FROM VESSEL FORMATION

(71) Applicant: Boundary Layer Technologies Inc., San Francisco, CA (US)

(72) Inventors: Cameron Flannery, San Francisco, CA (US); Edward Kearney, San Francisco, CA (US); Jeremy Osborne, San Francisco, CA (US); Tim Le Lievre, San Francisco, CA (US)

(73) Assignee: Boundary Layer Technologies Inc., San Francisco, CA (US)

( * ) Notice: Subject to any disclaimer, the term of this patent is extended or adjusted under 35 U.S.C. 154(b) by 0 days.

(21) Appl. No.: 17/089,659

(22) Filed: Nov. 4, 2020

(65) Prior Publication Data

US 2021/0341925 A1    Nov. 4, 2021

Related U.S. Application Data

(63) Continuation of application No. 17/040,528, filed as application No. PCT/US2020/031359 on May 4, 2020.

(Continued)

(51) Int. Cl.
*G05D 1/02* (2020.01)
*B63B 1/28* (2006.01)

(52) U.S. Cl.
CPC ............. *G05D 1/0206* (2013.01); *B63B 1/28* (2013.01); *B63B 1/285* (2013.01)

(58) Field of Classification Search
CPC .......... G05D 1/0206; B63B 1/00; B63B 1/28; B63B 1/285

(Continued)

(56) References Cited

U.S. PATENT DOCUMENTS 5,634,613 A * 6/1997 McCarthy ............. B64C 23/069
244/199.1
6,042,059 A * 3/2000 Bilanin ................... B64C 23/06
244/199.1

(Continued)

FOREIGN PATENT DOCUMENTS

CN    110162048 A    8/2019
CN    110254648 A    9/2019

(Continued)

OTHER PUBLICATIONS

International Search Report in International Application No. PCT/US2020/031359, dated Jul. 21, 2020.

*Primary Examiner* — Lars A Olson
(74) *Attorney, Agent, or Firm* — Cognition IP, P.C.; Edward Steakley

(57) ABSTRACT

Systems, devices, and methods are provided for operating a watercraft vessel. The system can include a communication unit configured to receive a position signal and a velocity signal of the first vessel. The system can include a first sensing unit configured to determine a relative position signal of one or more nearby vessels including the first vessel, a second sensing unit configured to detect and measure a fluid velocity field of a vortex around the watercraft vessel, and a third sensing unit configured to detect and measure an efficiency gain from a lifting force experienced by watercraft vessel operating in an upwash region of the vortex. And the system can include a control unit configured to maneuver the watercraft vessel from a first position to an optimum position.

20 Claims, 13 Drawing Sheets

Related U.S. Application Data

(60) Provisional application No. 62/988,372, filed on Mar. 11, 2020.

(58) Field of Classification Search
USPC .................................................... 114/61.13
See application file for complete search history.

(56) References Cited

U.S. PATENT DOCUMENTS

| | | |
|---|---|---|
| 2013/0213288 A1 | 8/2013 | Hall |
| 2016/0069987 A1 | 3/2016 | Ise |
| 2017/0174305 A1 | 6/2017 | Juergens et al. |

FOREIGN PATENT DOCUMENTS

| | | |
|---|---|---|
| KR | 10-1937443 B1 | 4/2019 |
| TW | 201620785 A | 6/2016 |
| WO | 2014/066645 A1 | 5/2014 |
| WO | 2020/045601 A1 | 3/2020 |

\* cited by examiner

LIFT FROM VESSEL FORMATION

CROSS REFERENCE TO RELATED APPLICATIONS

This application is a continuation of U.S. application Ser. No. 17/040,528, filed on Sep. 22, 2020, which is a 35 U.S.C. § 371 national stage application of PCT International Application No. PCT/US2020/031359, filed on May 4, 2020, which claims the benefit of U.S. Provisional Application No. 62/988,372, filed Mar. 11, 2020, which are hereby incorporated by reference in their entirety.

BACKGROUND

A hydrofoil vessel is a vessel that has lift generating foils, commonly known as hydrofoils or hydrowings under the water surface. As the vessel moves, the foils create hydrodynamic lift from the motion of the water flowing over the hydrofoil surface. The amount of lift generated is proportional to the plan area of the hydrofoils, the profile of the hydrofoils, the angle of attack of the hydrofoils, and the square of the average fluid velocity over the hydrofoils.

Lift generating vessels, such as hydrofoil vessels are limited in their operational range by how efficiently their wings can create lift. Wing efficiency is generally determined by the amount of drag that the wing produces as a ratio to the amount of lift the wing creates, often referred to as the lift-to-drag ratio. A high lift-to-drag ratio is highly beneficial for many vessel operations, as well as outputting less greenhouse gas into the environment.

Thus, improving the lift-to-drag ratio in a vessel, which would effectively increase fuel efficiency, particularly for a fleet is desired.

BRIEF SUMMARY

The present disclosure relates generally to systems, devices, and methods are for operating a watercraft vessel, including operating a fleet of watercraft vessels. In one aspect, the system can include a communication unit configured to receive a position signal and a velocity signal of the first vessel. In one aspect, the system can include a first sensing unit configured to determine a relative position signal of one or more nearby vessels including the first vessel, a second sensing unit configured to detect and measure a fluid velocity field of a vortex around the watercraft vessel, and a third sensing unit configured to detect and measure an efficiency gain from a lifting force experienced by watercraft vessel operating in an upwash region of the vortex. And in one aspect, the system can include a control unit configured to maneuver the watercraft vessel from a first position to an optimum position.

In one aspect, the watercraft vessel can be a hydrofoil vessel, the hydrofoil vessel including one or more hydrofoil assemblies, operably connected to a hull of the watercraft vessel, configured to generate lift during operation of the watercraft vessel. In one aspect, each of the one or more hydrofoil assemblies are in a fixed position relative to the hull of the watercraft vessel. In one aspect, each of the one or more hydrofoil assemblies can be vertically adjustable to change distance between the one or more hydrofoil assemblies and the hull. In one aspect, the vortex can be generated by a first hydrofoil assembly of the first vessel.

In one aspect, the first sensing unit can further include one or more sensors including a global positioning system (GPS), light detection and ranging (LiDar) sensor, radar, passive optical, or a combination thereof. In one aspect, the second sensing unit can further include one or more sensors including sonar sensor, ultrasonic sensor, acoustic doppler current profilers, or a combination thereof. In one aspect, the third sensing unit can further include one or more sensors including one or more inertial sensors, gyroscopes, accelerometers, inertial measurement units (IMUs), strain gauges, load cells, or a combination thereof. In one aspect, the one or more sensors of the third sensing unit can be operably connected or attached to a hydrofoil assembly of the watercraft vessel.

In one aspect, the optimum position can be determined by the control unit based at least in part on the position signal and velocity signal of the first vessel, the relative position signal of the first sensing unit, the fluid velocity field measured from the second sensing unit, the lifting force measured by the third sensing unit, or a combination thereof. In one aspect, the optimum position can be further determined by determining a peak upwash region of the vortex around the watercraft vessel.

In one aspect, the system can include a second control unit configured to automatically receive the relative position signal, fluid velocity field, a location of the measured upwash region of the vortex, the lifting force experienced by the watercraft, or a combination thereof, and maneuver the watercraft vessel to the optimum position.

In one aspect, the system can include a control interface for receiving inputs from a user, a remote device, or a combination thereof, and for transmitting sensing signals including the relative position signal, fluid velocity field, efficiency gain, or a combination thereof, to the user, the remote device, or a combination thereof.

In one aspect, the control unit can include a computational unit configured to detect the location of a free surface of water relative to a hydrofoil of the watercraft vessel and incorporate the location of the free surface of water in determining the optimum position. In one aspect, the control unit can include a computational unit configured to detect ocean waves, and incorporating vortex deformation caused by the ocean waves in determining the optimum position.

In one aspect, the control unit can be configured to maintain a relative position of the watercraft vessel from the first vessel. In one aspect, maneuvering the watercraft vessel from the first position to the optimum position can reduce drag experienced by the watercraft vessel.

In one aspect, a system for operating a watercraft vessel can include a communication unit configured to receive a position signal of a first vessel, a velocity signal of the first vessel, one or more sensing units configured to identify an optimum position, and a control unit configured to maneuver the watercraft vessel from a first position to an optimum position.

In one aspect, maneuvering the watercraft vessel from the first position to the optimum position can reduce drag experienced by the watercraft vessel. In one aspect, the one or more sensing units can include a first sensing unit configured to determine a relative position signal of one or more nearby vessels including the first vessel. In one aspect, the one or more sensing units can include a second sensing unit configured to detect and measure a fluid velocity field of a vortex around the watercraft vessel. In one aspect, the one or more sensing units can include a third sensing unit configured to detect and measure an efficiency gain from a lifting force experienced by watercraft vessel operating in an upwash region of the vortex.

In one aspect, the optimum position can be determined by the control unit based at least in part on the position signal and velocity signal of the first vessel, the relative position signal of the first sensing unit, the fluid velocity field measured from the second sensing unit, the lifting force measured by the third sensing unit, or a combination thereof. And in one aspect, the optimum position can be further determined by determining a peak upwash region of the vortex around the watercraft vessel.

In one aspect, a system for operating a trailing watercraft can include a control unit for maneuvering the trailing watercraft from a first position to a second position, a first sensing unit configured to determine a relative position of one or more nearby watercrafts including a leading watercraft or one or more different trailing watercrafts, a second sensing unit configured to detect and measure a fluid velocity field of a vortex created by the leading vessel, a third sensing unit configured to detect and measure an efficiency gain of the trailing watercraft operating in an upwash region of the vortex created by the leading vessel, and a control interface for receiving inputs and sending guidance information associated with the optimum position to a user or remote device. In one aspect, the system can include an autopilot unit configured to automatically receive the position sensing signals, vortex signals, upwash signals, lift sensing signals, or a combination thereof, and maneuver the trailing watercraft to an optimum position.

In one aspect, a method for operating a watercraft vessel can include determining a position signal and a velocity signal of a leading vessel, detecting a relative position, from one or more sensors, of a nearby vessel including the leading vessel or a different trailing vessel from the watercraft vessel, receiving measurements, from one or more sensors, of a fluid velocity field of a vortex created by the leading vessel, detecting a lifting force, from one or more sensors, experienced by the watercraft vessel operating in a region of the vortex, and maneuvering the watercraft vessel from a first position to an optimum position.

In one aspect, the method can include determining, automatically at a control unit of the watercraft vessel, the optimum position in real time based on the relative position, a magnitude of the fluid velocity field, the lifting force, or a combination thereof, and maneuvering, automatically, the watercraft vessel to the optimum position. And in one aspect, the method can include determining a peak upwash region of the vortex created by the leading vessel, and maneuvering the watercraft vessel to the optimum position in real time.

Other examples are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1A:
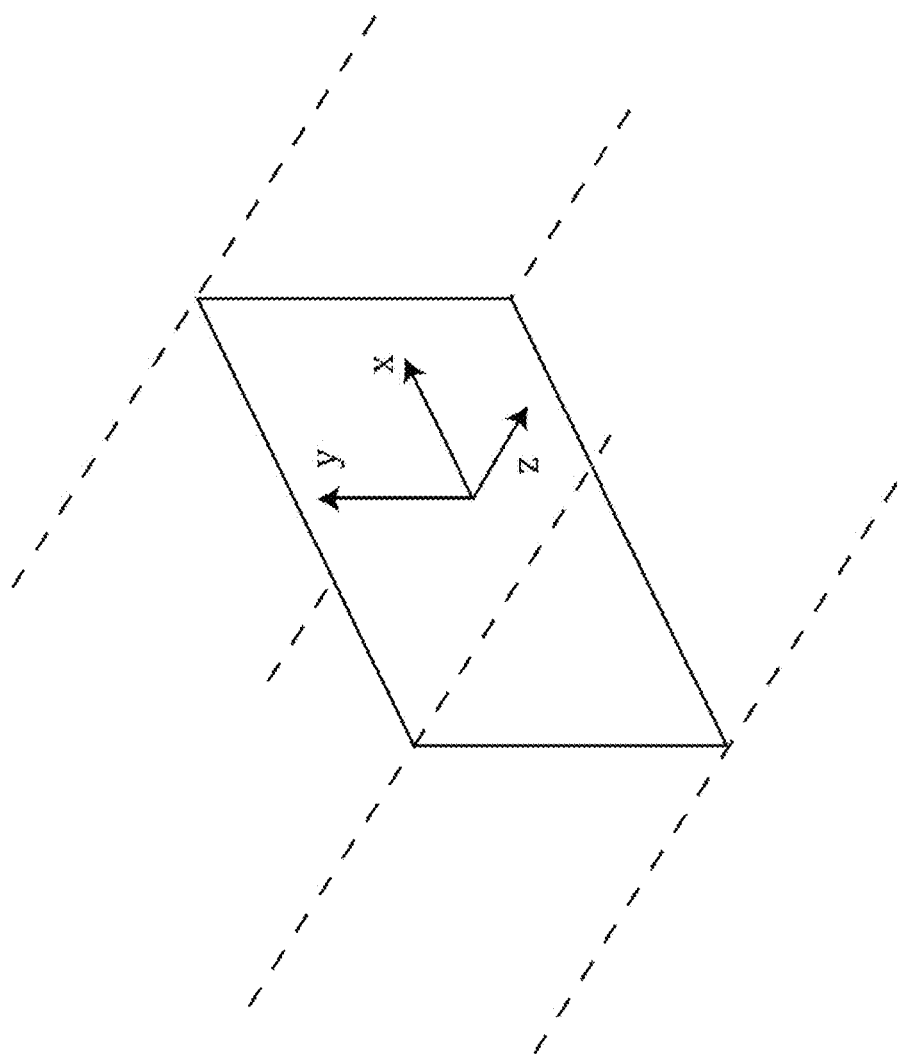
FIG. 1A-1B illustrate a plane representing a vortex plane in a 3D environment and 2D environment, respectively.

In this specification, reference is made in detail to specific examples of the disclosure. Some of the examples or their aspects are illustrated in the drawings.

For clarity in explanation, the disclosure has been described with reference to specific examples, however it should be understood that the disclosure is not limited to the described examples. On the contrary, the disclosure covers alternatives, modifications, and equivalents as may be included within its scope as defined by any patent claims. The following examples of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially.

A system for operating one or more vessels or watercraft vessels is described below, particularly for hydrofoil watercraft vessels. A hydrofoil water vessel is a vessel that includes one or more hydrofoil assemblies such that, under operation across a body of water, the vessel can operate a wide range of foilborne speeds while achieving an optimal lift to drag ratio for better operational efficiency.

In one example, a vessel, or ship can be equipped with a hydrofoil assembly that, when operated at certain speeds, can create lift to the vessel and bring the vessel foilborne. Once the vessel is foilborne, the amount of resistance and drag exerted onto the vessel is greatly reduced and the vessel can travel across water more efficiently.

In one example, the hydrofoil assembly can also be extendable and retractable such that lift can be varied depending on the speed. In this case, the hydrofoil assembly can be configured to maximize lift to achieve a low takeoff speed. The hydrofoil assembly can also be configured to produce the exact amount of lift required, as to maximize the moving speed, or cruising speed. Further, the hydrofoil assembly can also be configured to optimize stability, balance, and trim of the vessel.

Additionally, when operating lift-producing watercraft vessels such as hydrofoil watercraft vessels, the net efficiency of operating a fleet in close formation can be higher than that any single vehicle flying individually. Fleet position and relative vehicle positions can be determined using multiple measurements, devices, sensors, and instruments, and shared through inter-vessel communications.

The following description details an example system, device, and method of operating two or more hydrofoiling watercraft in formation such that a trailing watercraft positions its hydrofoil or hydrofoils to an upwash region of a vortex created by a forward watercraft, resulting in an increased lift and reduction of drag to the trailing watercraft. The example system and method can also be applied to an entire fleet of hydrofoil watercraft. The relative positioning can be automatically updated throughout the trip of the fleet to distribute the benefits of formation flying to each vessel.

Figure 1B:
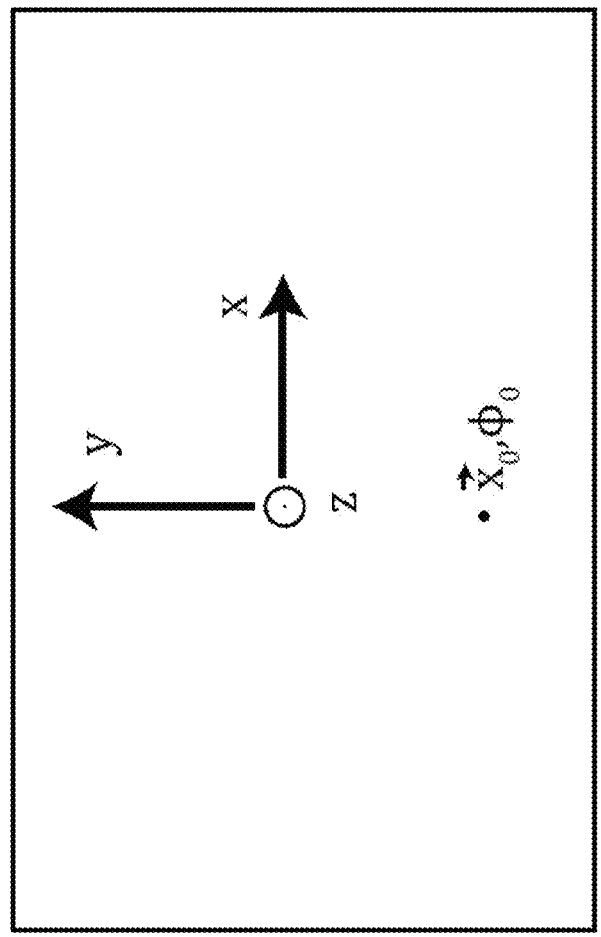

FIGS. 1A-1B illustrate coordinate planes representing a vortex having a center at the center of the coordinate plane. FIGS. 1A and 1B can be used to determine and describe the position of a vortex center created by a watercraft vessel under operation. The position defined as $\vec{x}_0$, $\varphi_0$ can be an initial position and phase of a vortex in the perpendicular vortex plane shown in FIGS. 1A-1B.

Figure 2A:
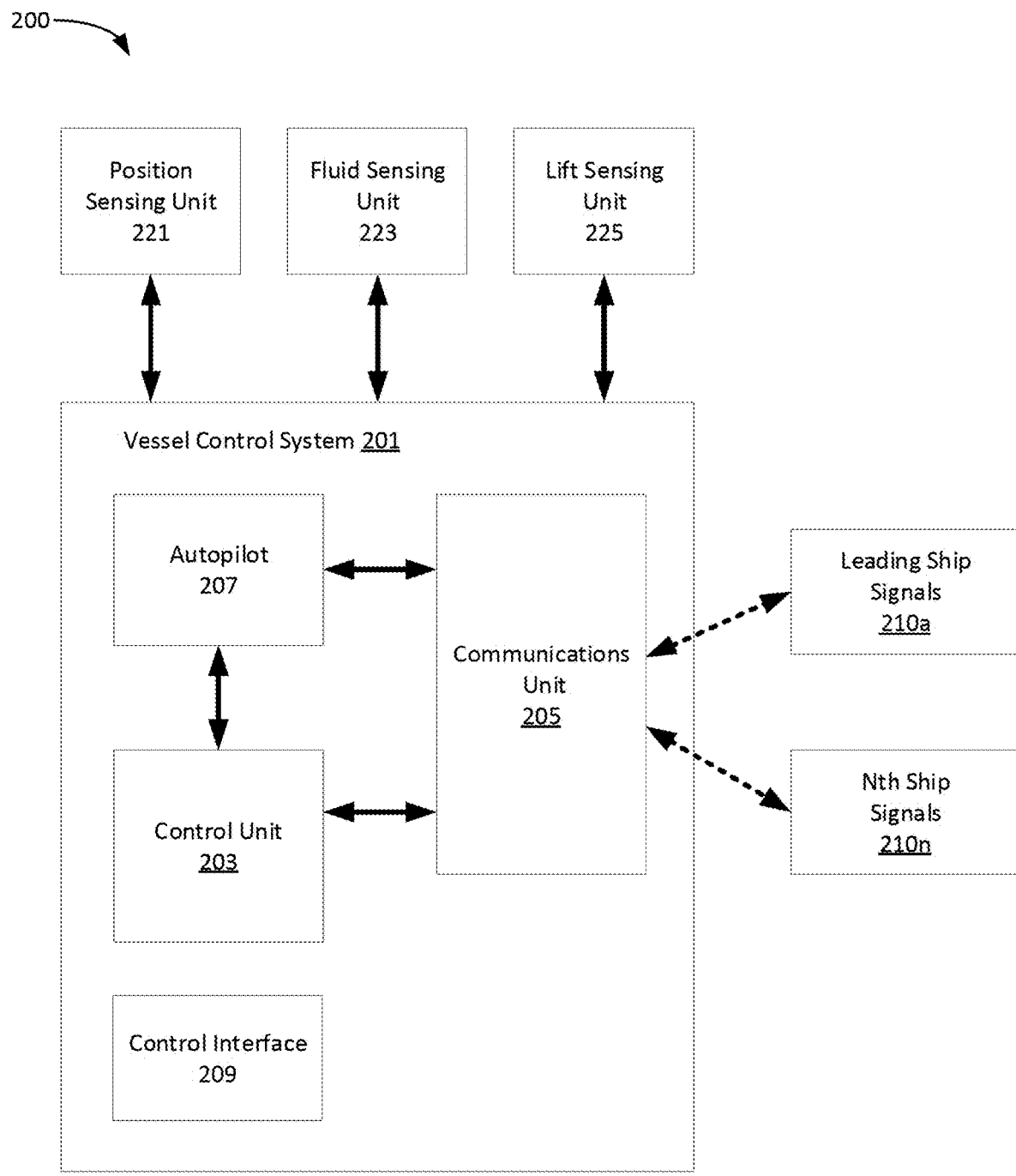
FIG. 2A illustrates a system diagram of a vessel control system in accordance with various aspects of the subject technology.

FIG. 2A illustrates an example system architecture of a vessel control system for operating one or more watercraft vessels for vessel formation. As illustrated in FIG. 2A, a system architecture or system environment 200 includes a vessel control system 201, which can be a control system embedded in a single watercraft vessel, configured to monitor maneuver vessel. The vessel control system 201 can include a control unit 203, a communications unit 205, an autopilot unit, or autopilot 207, and a control interface 209. Each of the control unit 203, communications unit 205, autopilot 207, and control interface 209 are operably connected to each other. The control unit 203 is configured to receive inputs, requests, measurements, sensor data and information, and other signals from other components of the vessel control system 201, components operably attached or embedded in the watercraft vessel, or other information from the outside physical environment such as fluids, or other vessels or objects. And is configured to send signals or instructions to maneuver the watercraft vessel from one location to another, or from one speed to another, or from one orientation of the hydrowings to another, etc. This can be done by connecting the vessel control system 201 to mechanical or electrical components of the watercraft vessel configured to physically maneuver the vessel such as engines, propellers, motors, batteries, hydrowing, rudder, flaps, ailerons or hydrowing controls, or other control surfaces, or thrust or propulsion generating components.

In this example, the communications unit 205 is configured to receive communication data or signals from other vessels, ships, watercraft, aircraft, or other objects that can send and receive communication signals. The communications unit 205 can be part of an inter-vessel communication system for vessels of an entire fleet to send and receive information among each of the vessels. The communication signals can generally be related to movement and positioning data. For example, the vessel control system 201 can be part of a trailing watercraft vessel that is looking to optimize lift experienced by its hydrowings by maneuvering to specific regions of a vortex created by a forward ship or leading ship. In this example, the leading ship can send communication signals 210a to the communications unit 205 of the vessel control system 201. The communication signals 210 can include a position signal and a velocity signal of the first ship or first vessel and provided to the trailing watercraft vessel with the vessel control system 201. The position and velocity signals of the leading vessel can be used by the vessel control system 201, at the control unit 203, or autopilot 207, or send to a user manually controlling the vessel control system 201 through the control interface to determine the best estimated position of the trailing watercraft vessel to operate in an upwash region of a vortex created by the leading vessel's hydrowings.

In this example, the vessel control system 201 can also be connected to, or receive sensing information and data from, a plurality of sensors located in various components of the watercraft vessel or operably attached to various components of the watercraft vessel. For example, the vessel control system 201 can operably connected to a position sensing unit 221. The position sensing unit 221 can be configured to determine a relative position of nearby objects. While the information about the relative position of nearby vessels can be obtained from the nearby vessels themselves through communication signals 210a of a leading vessel or 210n of a different trailing vessel, the sensing information from the position sensing unit 221 can be used by the vessel control system 201 to more accurately determine the position and velocity of a nearby vessel such as a leading vessel or a different trailing vessel. In this example, the sensing unit 221 can include one or more sensors including a global positioning system (GPS), light detection and ranging (LiDar) sensor, radar, passive optical, or a combination thereof, each of the one or more sensors located throughout various physical locations of the watercraft vessel. In this example, the vessel control system 201 can also be operably connected to a fluid sensing unit 223. The fluid sensing unit 223 can be configured to accurately sense the position of the upwash region of fluid of the vortex created by a vessel in front of the vessel with the vessel control system 201. In this example, the fluid sensing unit 223 can include one or more sensors including sonar sensor, ultrasonic sensor, acoustic doppler current profilers, or a combination thereof, each of the one or more sensors can be embedded or operably attached to various physical components of the watercraft vessel. In this example, each of the sensors can be used to measure different measurements related to calculating, estimating, or determining, the fluid velocity, and effectively the vortex shape and magnitude, in the upwash region such that the control unit 203 can maneuver the watercraft vessel to the portion of the upwash region of the vortex with the highest upward vertical fluid velocity, which effectively maximizes the lift experienced by the hydrowings. In one example, the one or more sensors of the fluid sensing unit 223 can constantly scan for fluid velocity and upwash region measurements.

The vessel control system 201 can also be operably connected to a lift sensing unit 225. The lift sensing unit 225 can be configured to accurately sense and measure the lifting force experienced by the watercraft vessel itself. Unlike the fluid sensing unit 223, which senses the fluid velocity field around the watercraft vessel, particularly for example, a fluid velocity field of a vortex created by a leading watercraft vessel operating in front of the watercraft vessel, the lift sensing unit measures force, lift, strain, acceleration, or other motion sensing measurements experienced by the watercraft vessel. In this example, the lift sensing unit 225 can include one or more sensors one or more sensors including one or more inertial sensors, gyroscopes, accelerometers, inertial measurement units (IMUs), strain gauges, load cells, or a combination thereof. In one example, each of the one or more sensors of the lift sensing unit 225, can be operably connected to a hydrofoil assembly of the watercraft vessel. The measurements from the lift sensing unit 225 can be used to more accurately, in conjunction with the measurements and sensing information obtained from the fluid sensing unit 223, determine whether the position of the watercraft vessel is the optimum position while operating within the vortex created by another vessel. Alternatively, the measurements and sensing information and data from the lift sensing unit 225, can be used to determine the efficiency gain from the position the watercraft vessel from a first position, to a second position that is estimated to have an upwash region detected by the various sensing units. In this example, since vortex strength is proportional to lift, maneuvering the watercraft vessel to a portion of the upwash region with a higher, or highest, vertical fluid velocity would effectively result in a higher, or peak lift experienced by the hydrowings of the watercraft vessel.

In one example, the vessel control system 201 includes a control interface 209 configured to provide guidance to a user, such as a user, such as a pilot or helmsman, by presenting the information received from the one or more sensors or communication signals from other vessels and watercrafts. The information displayed can be each of the position related information, efficiency information, fluid velocity or fluid sensing information. The information displayed can also be related to a suggestion for the user to maneuver the watercraft vessel from an initial position to a desired or optimum position such that the watercraft is operating in the upwash region, or peak upwash region of the vortex created by a leading vessel. The control interface 209 is configured to provide real time information to the user such that when environmental conditions change, or relative movement, speed, positions, or a combination thereof, changes for the leading vessel, the control interface 209, can constantly update the user where the next optimum position to trail behind the leading vessel is, if the optimum position changes at all. This allows the pilot to maximize the benefit of the upwash from the leading vessel, by suggesting a position, speed, heading, orientation, altitude configured from changing the speed of the overall watercraft vessel or by adjusting the hydrowing orientation and height relative to the hull of the watercraft vessel, course, or a combination thereof, to optimize the efficiency gain from the vortex. Additionally, the control interface 209 can also suggest the suggested flight path to reach the position, speed, heading, altitude, or a combination thereof, on top of displaying the suggested position.

In one example, the autopilot 207 is configured to automatically determine both the optimum position for experiencing peak upwash as well as determine the best flight path to reach the optimum position, speed, heading, altitude, or a combination thereof. The autopilot 207 can also automatically signal the control unit 203 to maneuver or orient the watercraft vessel to the changed conditions. The autopilot can receive information and signals related to the relative position signal, fluid velocity field, a location of the measured upwash region of the vortex, the lifting force experienced by the watercraft, or a combination thereof, and maneuver the watercraft vessel to the optimum position.

For example, if the leading vessel increases speed, the autopilot 207 can also automatically increase the speed of the watercraft vessel to maintain the same speed as that of the leading vessel to maximize the benefit of the vortex generated by the leading vessel. In another example, if the vessel control system 201 determines that hydrowing is too low under the surface of water to experience the maximum upwash region, the autopilot 207 can automatically, through the control unit 203 increase the speed of the watercraft to generate more lift and raise the hydrowing's position, along with the rest of the watercraft including its hull, from the surface of water.

Figure 2B:
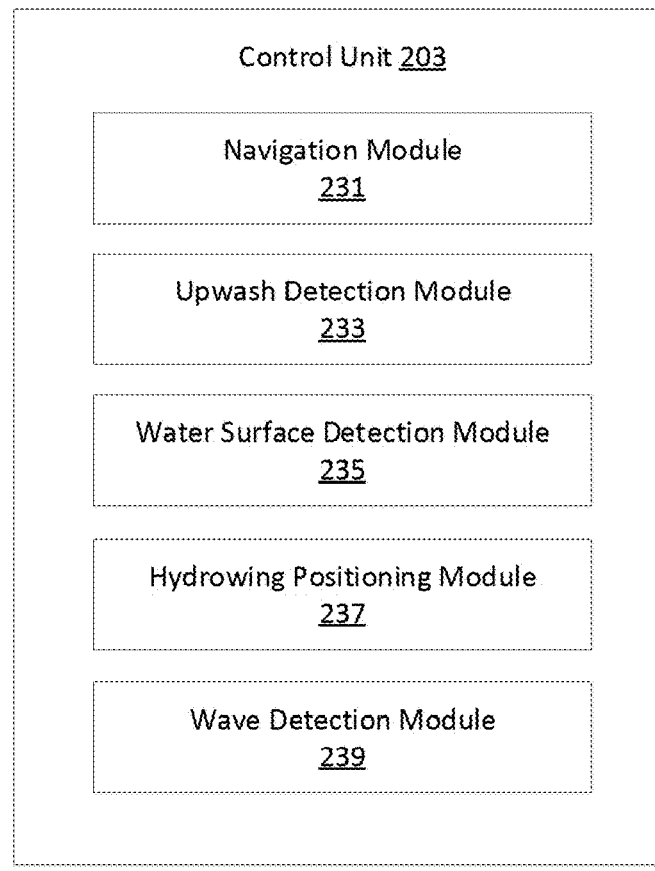
FIG. 2B illustrates an exemplary component of the system diagram of the vessel control system of FIG. 2A in accordance with various aspects of the subject technology.

As illustrated in FIG. 2B, the control unit 203 can further include components and modules that allow the vessel control system 201 to determine an optimum position for the watercraft vessel to experience the maximum lift from the vortex created by the leading vessel. In one example, the control unit 203 can include a navigation module 231 for sending and receiving instructions for maneuvering the vessel from an initial position or heading to a second position or heading. The control unit 203 can also include an upwash detection module 233 that is configured to detect peak upwash from the vortex created by a leading vessel. The control unit 203 can also include a water surface detection module 235 configured to detect the location of the surface of the water. At the surface of water, there will no longer be any upwash region that can cause more lift for a hydrowing. The water surface detection module 235 can be used to in conjunction with the different measurements described above in determining the optimum position for the watercraft vessel.

In one example, the control unit 203 can also include a hydrowing positioning module 237 configured to adjust the orientation and vertical position of the watercraft vessel relative to the water surface. A watercraft vessel can include a hull, one or more fixed or extendable and retractable hydrowing supports, and one or more hydrowings operably connected to the hull of the watercraft vessel through the hydrowing supports. The distance between the hull of the watercraft and the surface of water can be changed and controlled based on the speed of the watercraft as the hydrowing displaces water under operation. The distance between the hull and hydrowing can be changed from the extending or retracting of the hydrowing supports. For example, each of the one or more hydrofoil assemblies can be vertically adjustable to change distance between the one or more hydrofoil assemblies and the hull. Additionally, the hydrowing positioning module 237 can also be configured, by the leading ship, to predict the optimum altitude to operate at to create vortices and upwash that will be most beneficial to the rearward vessels.

In one example, the control unit 203 can also include a wave detection module 239. Discussed in further detail below, the wave detection module 239 includes a computational unit configured to the presence of ocean waves, for example, long wavelength ocean waves, and incorporating vortex deformation caused by the ocean waves in determining the optimum position. This can be done, for example, by incorporating determining the water particle orbital velocities into calculating the location of the peak upwash region. In another example, the hydrowings can be vertically adjusted or oriented with a different pitch, such as a pitch up or pitch down from an initial pitch, due to the presence of waves deforming the vortex.

In one example, the vessel control system 201 can determine the optimum position for the watercraft vessel by receiving sensing information and data, and calculating the peak upwash region of the vortex detected around the watercraft vessel. In this example, the optimum position can be determined by the control unit 203 based at least in part on the position signal and velocity signal of the first vessel, the relative position signal of the first sensing unit, the fluid velocity field measured from the second sensing unit, the lifting force measured by the third sensing unit, or a combination thereof.

Further, the vessel control system 201 can be part of a network of vessel control systems controlled by a centralized control system. The control interface 209 can receive inputs from a user, a remote device, or a combination thereof, and transmit sensing signals including the relative position signal, fluid velocity, efficiency gain, or a combination thereof, to the user, the remote device such as a device with the centralized control system, or a combination thereof.

In one example, the vessel control system 201, can determine an optimum position, orientation, or heading of the watercraft vessel by a plurality of algorithms used to calculate measurements and characteristics of a vortex. In one example, under the bound vortex model and Helmholtz theorems, the strength of the vortices can be calculated. The circulation of the vortex is given equivalent to that of the wing.

In one example, the Kutta-Jukowski Theorem is then used to determine the circulation of the wing from lift and the flow properties, defined by the equation:

$$\Gamma = L/\rho V$$

where $\Gamma$ is the circulation of the vortex, L is the lift, $\rho$ is the density, and V is the velocity.

Trailing vortices in high Reynold's Number flows rapidly become irrotational. As such, the velocity field in a Trefftz plane downstream from the leading wing can be determined using the Biot-Savart law, defined by:

$$q = \frac{\Gamma}{4\pi r}(Rr)$$

where q is the vorticity, r is the 2D position vector of a point in the Trefftz Plane and R is a +90 degree rotation matrix. An additional benefit of high Reynold's Number flow is the small effect of streamwise separation. Vortex strength in inviscid flows is constant in time; similarly, in high Reynold's Number flows, where inertial forces are far greater than viscous forces, vortex strength persists for long periods of time. Thus, there is a region of upwash outboard of a finite span wing. A wing placed in this region of upwash benefits from a reduction in drag and an increase in lift as a result of the induced angle of attack.

The overall effect of flying a trailing vehicle in the upwash region of a leading wing is an increase in the lift-to-drag ratio. Fuel efficiency and range are major factors in the economic viability, and environmental sustainability, of flight vehicles. The flight range of a vehicle is proportional to the lift-to-drag ratio, according to the Breguet Range Equation.

$$\text{Range} \propto \frac{L}{D}$$

Figure 3A:
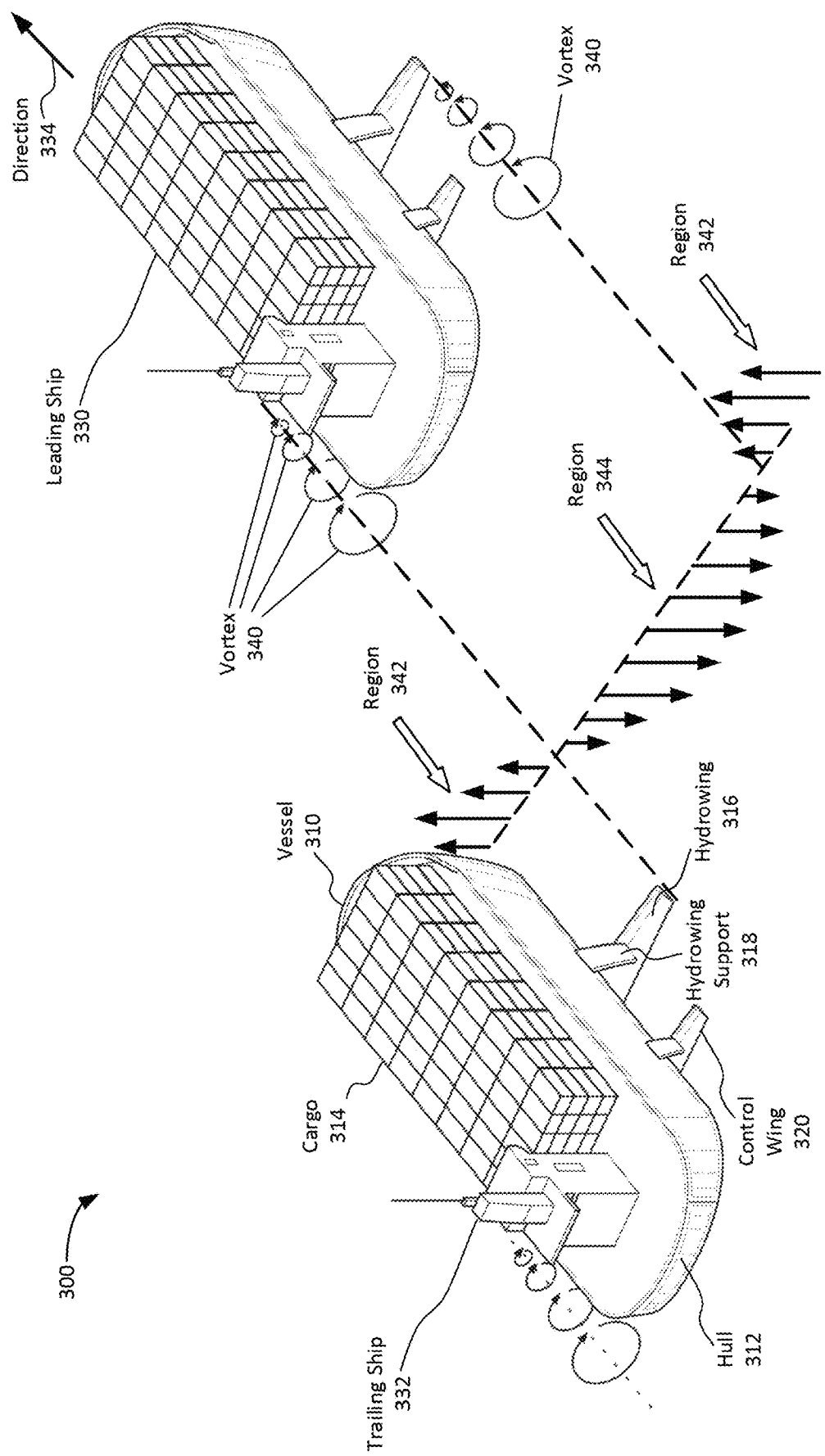
FIG. 3A illustrates a perspective view of two watercraft vessels operating in formation in accordance with various aspects of the subject technology.
Figure 3B:
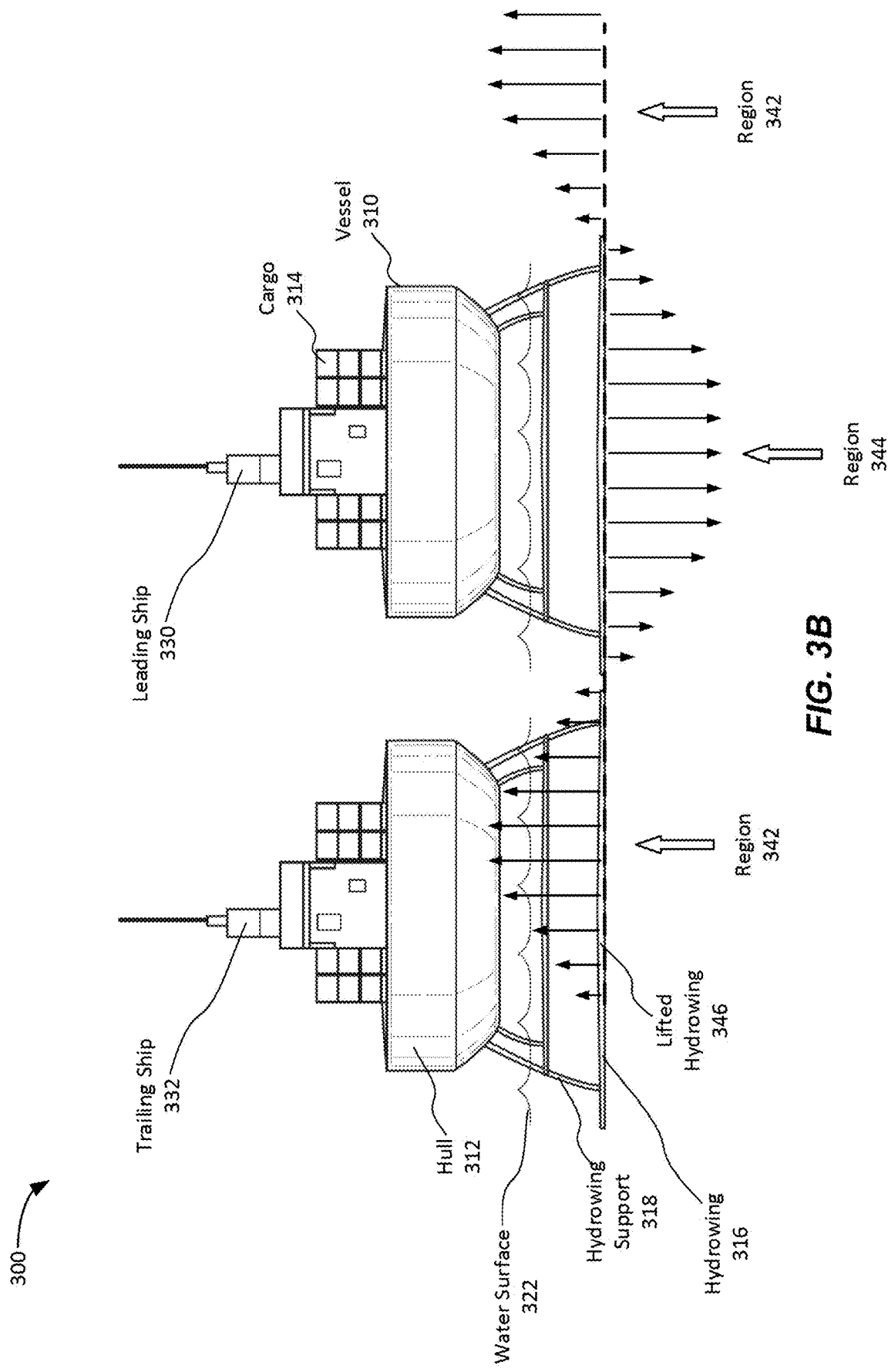
FIG. 3B illustrates a rear view of the two watercraft vessels operating in formation of FIG. 3A in accordance with various aspects of the subject technology.

FIGS. 3A-B illustrate an example of formation flight with a leading vessel and a trailing vessel. As illustrated in FIG. 3A, a perspective view, and FIG. 3B, a rear view, a flight formation 300 is described below. In this example, a pair of vessels 310, including a leading ship 330, and trailing ship 332, each include a hull 312, a hydrowing 316 configured to generate lift for the ships to allow the ships to be foilborne under operation, a hydrowing support 318, for example a fixed hydrowing support, a control wing 320. In one example, the vessels can be cargo vessels that carry cargo 314 for long distance travel from one location to another.

In this example, illustrated by both FIGS. 3A and 3B, the leading ship 330, under operation and traveling in the direction 334, generates a pair of vortices behind the leading ship 330. One vortex 340 is generated from a left wingtip of the hydrowing 316, and another vortex 340 is generated from a right wingtip of the hydrowing 316. The vortex 340 generated by the left side of the hydrowing 316 will cause a portion of fluid behind the leading ship 330 to orbit in a clockwise direction. The vortex 340 generated by the right side of the hydrowing 316 of the leading ship will cause fluid to orbit in a counterclockwise direction. In this state of operation, a region 342 on one side of the center axis of the vortex 340 and above another axis of the vortex 340 will be an upwash region. Another region 344 of the vortex 340 on the other side of the center axis will be a downwash region.

In this example, the trailing ship 332 can be maneuvered to position itself to the upwash region of the vortex 340, thus experiencing lift from the vortex 340. As discussed earlier, the trailing ship 332 can be maneuvered by a pilot, or autopilot unit embedded in the vessel control system of the trailing ship 332. As illustrated in FIG. 3A, the trailing ship 332 can move from an initial position to an optimum position to maximize the benefit of the upwash region. If the trailing ship 332 is too far behind or away from the leading ship 330, even if the trailing ship is traveling on the correct side of axes of the vortex, the magnitude of the velocity field experienced by the hydrowing 316 of the trailing ship 332 would be marginal or negligible.

Additionally, as illustrated in FIG. 3B, the upwash region 342 is not uniform. For example, the upwash region 342 can have a shape of a curve with a peak upwash region. In this example, the trailing ship 332 can be maneuvered to catch the upwash region of the vortex 340, thus experiencing the maximum amount of lift from the vortex 340. In one example, because the magnitude of each portion of the upwash region is not uniform, portions of the hydrowing 316 will experience different amounts of lift as that of other portions of the hydrowing 316 since only a portion of the hydrowing 316 may experience the peak upwash region of region 342. Thus, the lifted hydrowing 346, in this example, may be constantly pushed up and away from the leading ship 330. In this instance, the pilot or autopilot would need constantly adjust course, heading, or a combination thereof, to maintain the trailing ship 332 a set distance away from the leading ship 330 or maintain the trailing ship 332 always at the peak upwash region of the vortex.

Figure 4A:
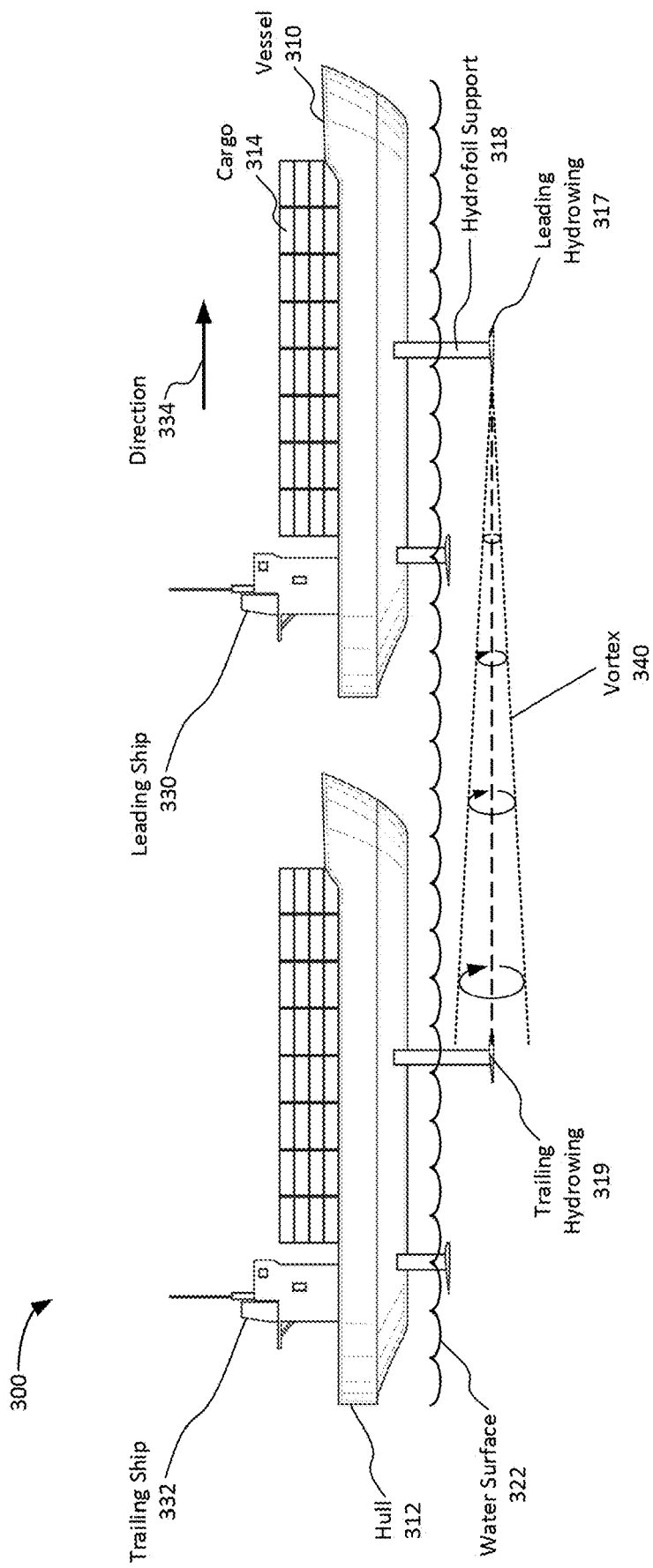
FIG. 4A illustrates a side view of two watercraft vessels operating in formation in accordance with various aspects of the subject technology.

Further illustrated in FIGS. 4A-C, a flight formation 300 is described below. As shown in FIG. 4A, a side view example is shown of a pair of vessels 310, including a leading ship 330, and trailing ship 332, each include a hull 312, a hydrowing 316 configured to generate lift for the ships to allow the ships to be foilborne under operation, a hydrofoil support 318, for example a fixed hydrowing support, a control wing 320. In one example, the vessels can be cargo vessels that carry cargo 314 for long distance travel from one location to another. Further illustrated in FIG. 4A, the vortex 340 has also has a peak upwash region along the center line of the vortex 340. In this example, the trailing ship can extend or retract its trailing hydrowing 319, or increase or decrease speed of the trailing ship 332 to position its trailing hydrowing 319 to a peak upwash region behind the leading ship 330. In another example, the hydrowing 317, and trailing hydrowing 319 are fixed and do not retract or extend relative to the body of the leading ship 330 and trailing ship 332. In another example, the hydrowing support for the leading hydrowing 317 and trailing hydrowing 319 can be angled relative the hulls of each vessel such that the hydrowing support does not extend vertically to the hydrowing, but instead at an angle.

Figure 4B:
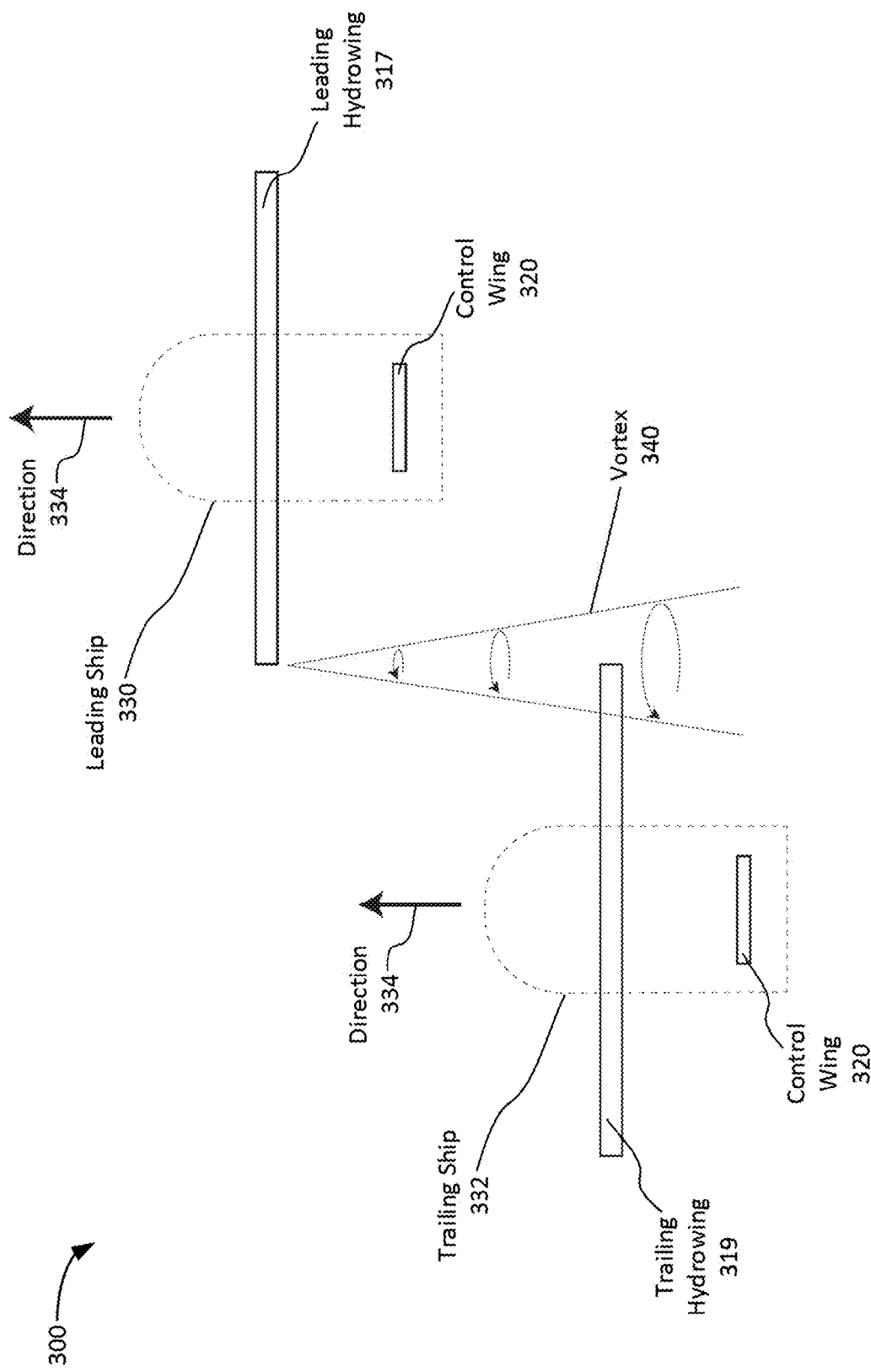
FIG. 4B illustrates a top view of the two watercraft vessels operating in formation of FIG. 4A in accordance with various aspects of the subject technology.
Figure 4C:
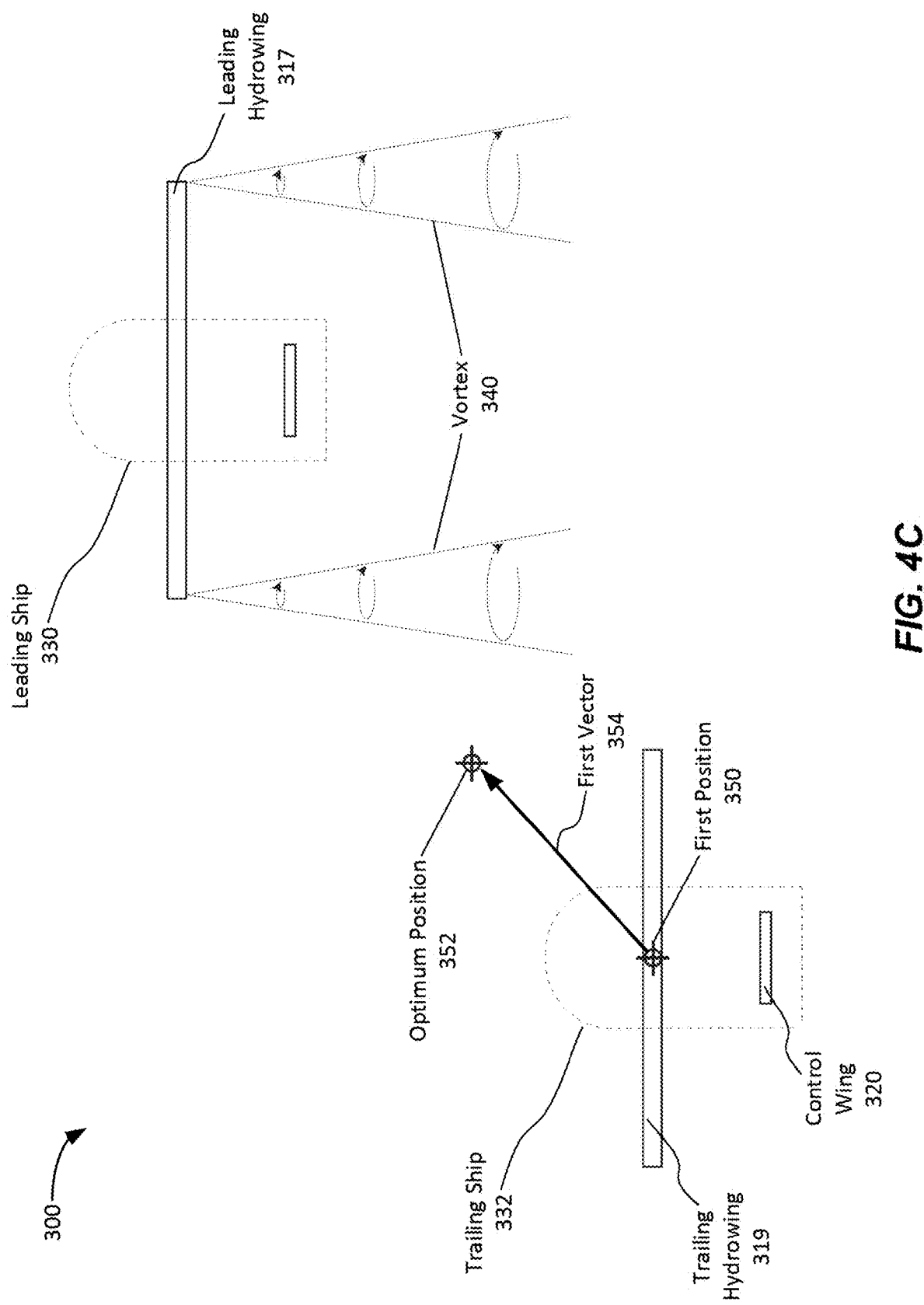
FIG. 4C illustrates a desired position of a watercraft vessel of the two watercraft vessels operating in formation of FIG. 4B in accordance with various aspects of the subject technology.

In this example, FIGS. 4B and 4C, illustrate a top view of the of the formation flight 300 with a leading ship 330 and trailing ship 332. As shown in FIGS. 4B and 4C, the trailing ship 332 is located a position to the rear and left of the leading ship 330. In this example, the trailing ship 332 is in a first position 350 and has identified an optimum position 352 from the vessel control system of the trailing ship 332. The trailing ship can generate a first vector 354 which identifies the course to maneuver to the optimum position 352 to experience maximum upwash of the vortex created by the leading ship.

Figure 5:
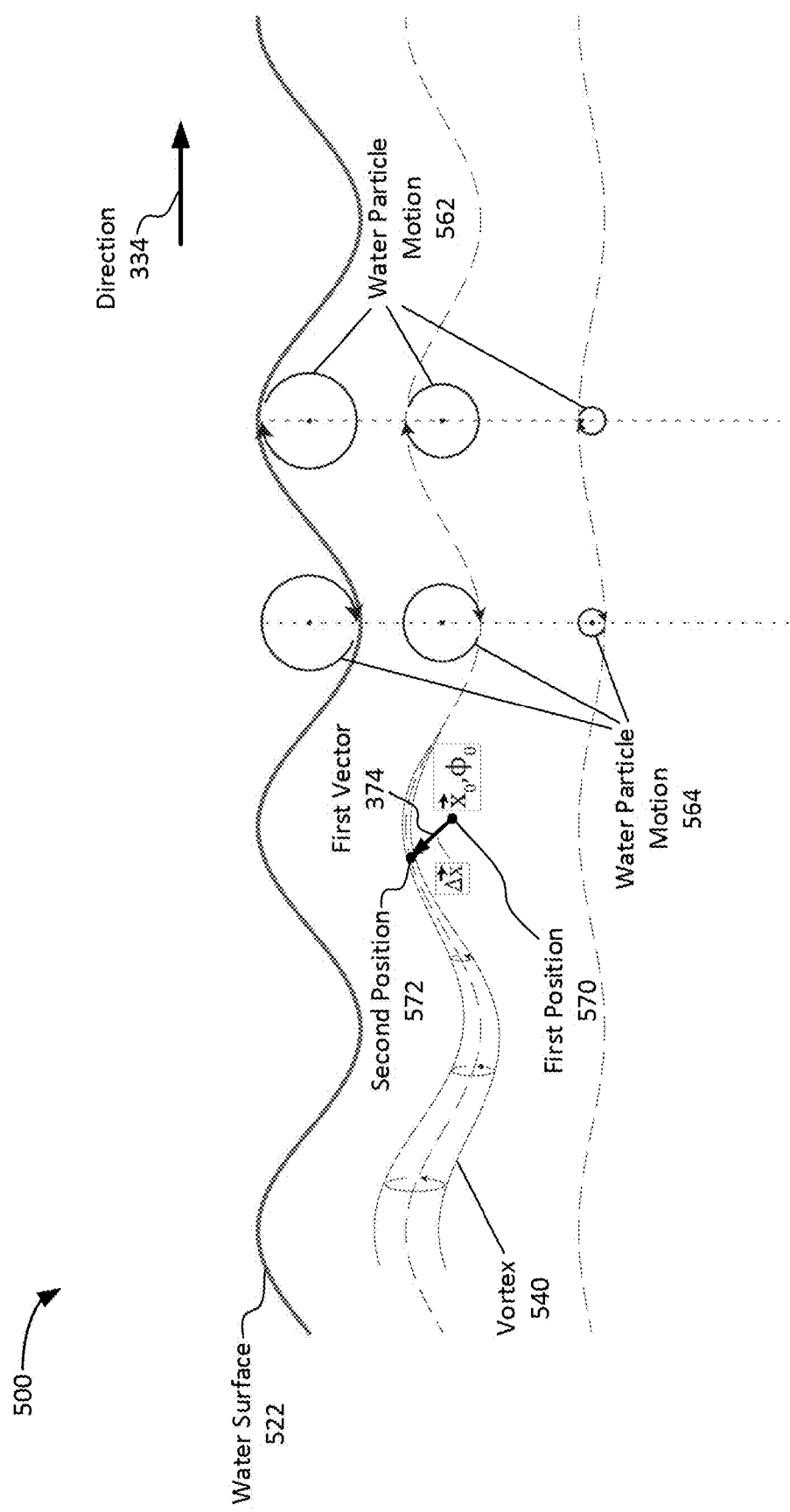
FIG. 5 illustrates a side view of a vortex including surface interaction and wave orbital motion.

FIG. 5 illustrates a vortex 540 generated by a leading ship (not shown) that experiences deformation due to an ocean or water wave, for example long wavelength ocean waves. As illustrated in FIG. 5, due to ocean waves, a water surface 522, and any plane of water particles beneath a water surface will be deformed due to each water particle having an orbital motion, illustrated by water particle motion 562 and water particle motion 564. Generally, water particles near the water surface 522 will experience bigger orbital movement. This in turn affects any vortices created by hydrofoil vessels. Thus, a fleet of hydrofoil vessels will need accommodate for any deformed vortices during formation flight in order to maintain a position of peak upwash region of the vortex, since the vortex itself will be deformed. For example, a deformed vortex can be detected by identifying a water particles position, and orbital phase due to the ocean waves. A water particle in a vortex detected by sensors, for example at a first position 570, can be deformed to a second location 572. The distance and location of the second position relative to the first position can be expressed by a first vector and the trailing ship can adjust speed, hydrowing distance from the water surface 522, or a combination thereof, to change the hydrofoil from a position that would have traveled to, for example the first position 570 to experience maximum upwash of the vortex, to second position 572 where the maximum upwash position has deformed to ocean waves.

In one example, the detection and calculation of the position of the deformed vortices can be determined by a plurality of algorithms used to calculate measurements and characteristics of the deformed vortex.

The position of the vortex can be predicted by estimating the linear superposition of the vortex and the linear wave motions of the ocean field.

In one example, the method for determining the position of the vortex in waves is the application of Airy Linear Wave Theory. In this method, the wave(s) are assumed to be of constant amplitude a frequency during the time between vortex generation and vortex energy capture.

Figure 7:
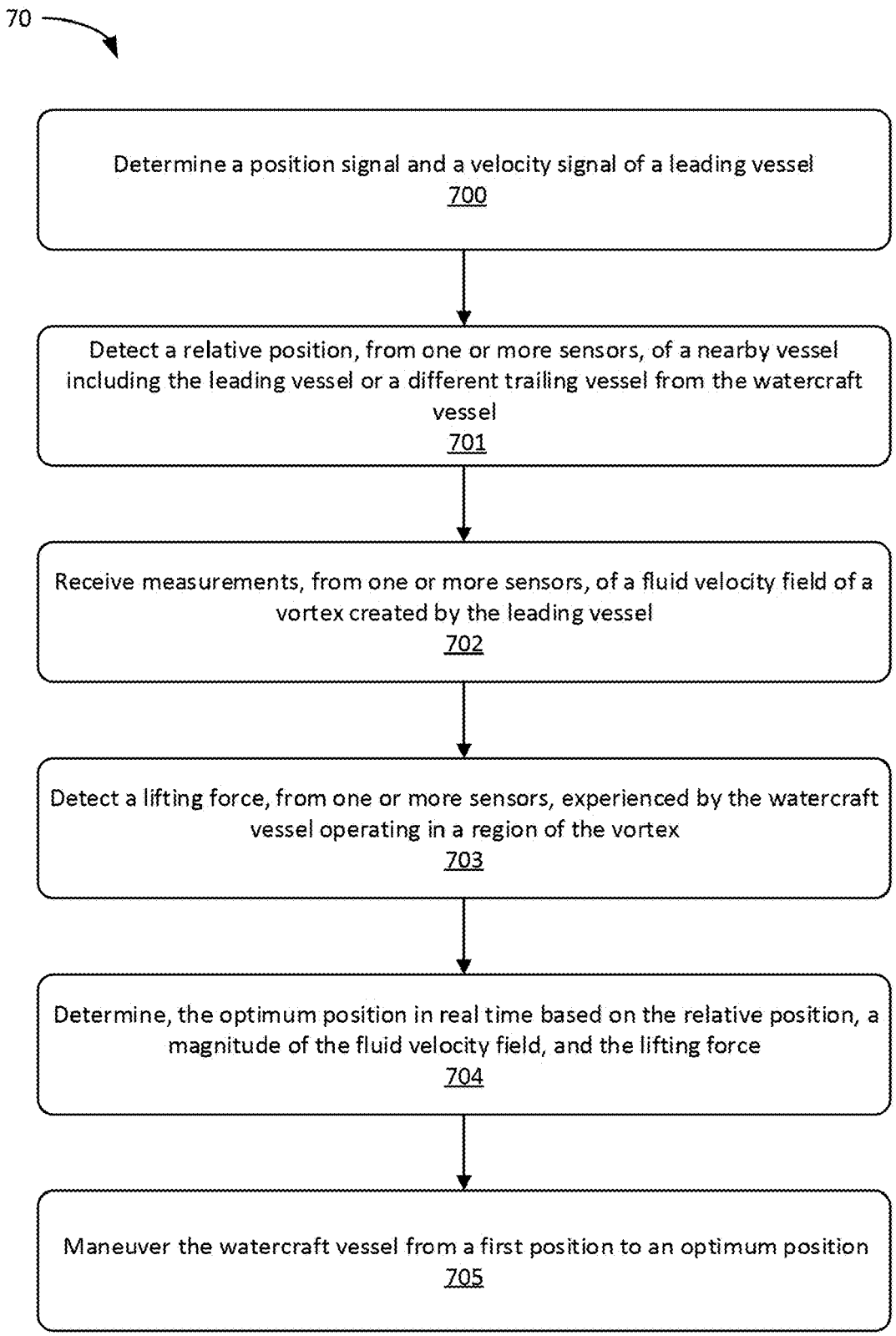
FIG. 7 illustrates another example flow process of operating a watercraft vessel in accordance with various aspects of the subject technology.
Figure 8:
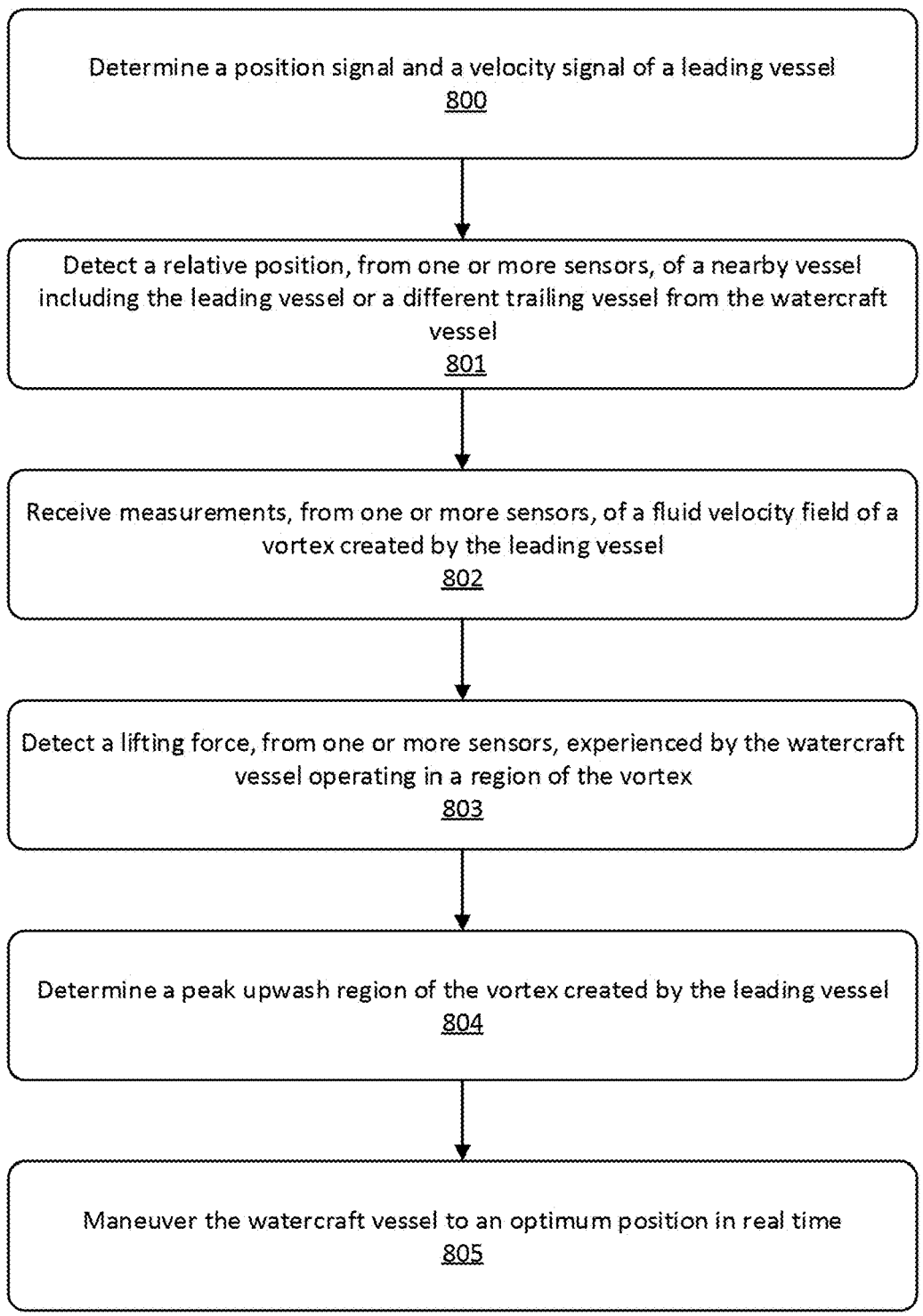
FIG. 8 illustrates another example flow process of operating a watercraft vessel in accordance with various aspects of the subject technology.

The initial position of the vortex center is described by the x, y position in a plane perpendicular to the vortex axis, as in FIGS. 7 and 8. The coordinates frame is fixed to the mean surface of the water. The excursion of a particle $\Delta \vec{x}$ is dependent on the reference particle position and the wave direction and phase. The reference particle position, $x_{ref}$, is defined as the position of the particle without any excursion due to orbital motion—equivalently, the position of the particle in still water, the equation defined by:

$$\Delta \vec{x} = A \begin{bmatrix} \sin\Phi\sin\theta \\ \cos\Phi \end{bmatrix} \left(1 - \begin{bmatrix} 0 & \frac{\lambda}{2} \end{bmatrix} \vec{x}_{ref}\right)$$

where $\phi$ is the phase of the wave and $\theta$ is the direction of the wave. Given some initial position of the vortex, the reference vortex center is determined by an iterative method, such as Newton's method. As defined by:

$$\vec{x}_0 = \vec{x}_{ref} + \Delta \vec{x}$$

the reference vortex center can be used to propagate the vortex position in the future. An error equation can be used to find a reference position of the vortex, defined by:

$$\vec{e} = \vec{x}_{ref} + \Delta \vec{x} - \vec{x}_C$$

With knowledge of the reference position of the vortex center, the vortex center can be approximated as:

$$\vec{x} = \vec{x}_{ref} + \Delta \vec{x}$$

In one example, in cases where multiple wavefields are present, disturbances can be treated as linear superpositions.

The amplitude, phase, and direction of each component of the wave field can be computed from measurements taken around the leading or trailing ships through methods including but not limited to Radar, Lidar and visual spectrum imaging methods.

Figure 6:
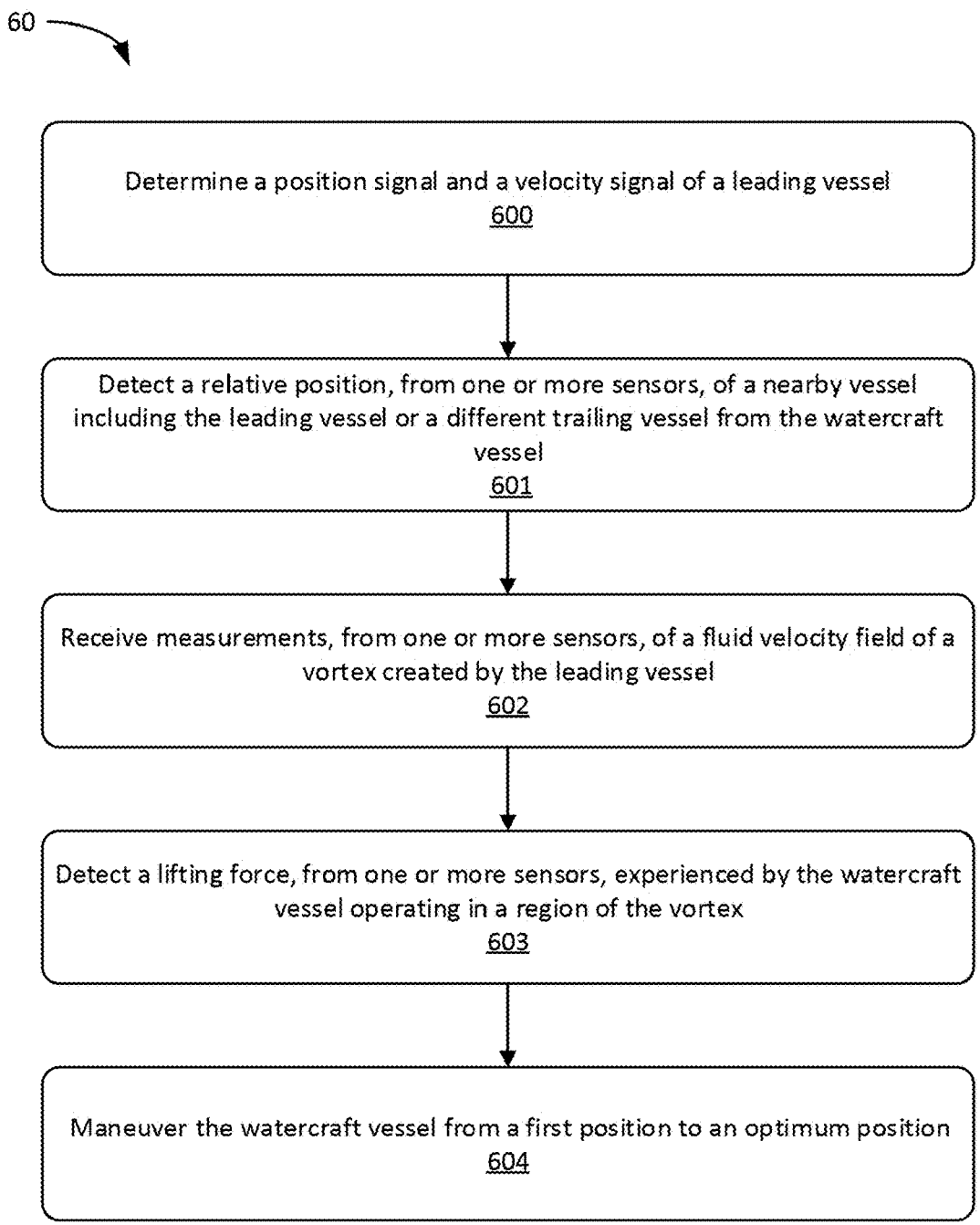
FIG. 6 illustrates an example flow process of operating a watercraft vessel in accordance with various aspects of the subject technology.

FIG. 6 illustrates a flow chart of an example process for operating a watercraft vessel. In one example, the process can be performed for operating and managing a fleet of watercraft vessels under operation.

In the example flow diagram 60 of FIG. 6, at block 600, a vessel control system can determine a position signal and a velocity signal of a leading vessel.

At block 601, the vessel control system can detect a relative position, from one or more sensors, of a nearby vessel including the leading vessel or a different trailing vessel from the watercraft vessel.

At block 602, the vessel control system can receive measurements, from one or more sensors, of a fluid velocity field of a vortex created by the leading vessel.

At block 603, the vessel control system can detect a lifting force, from one or more sensors, experienced by the watercraft vessel operating in a region of the vortex.

And at block 604, the vessel control system can maneuver the watercraft vessel from a first position to an optimum position.

FIG. 7 illustrates another flow chart of an example process for operating a watercraft vessel.

In the example flow diagram 70 of FIG. 7, at block 700, a vessel control system can determine a position signal and a velocity signal of a leading vessel.

At block 701, the vessel control system can detect a relative position, from one or more sensors, of a nearby vessel including the leading vessel or a different trailing vessel from the watercraft vessel.

At block 702, the vessel control system can receive measurements, from one or more sensors, of a fluid velocity field of a vortex created by the leading vessel.

At block 703, the vessel control system can detect a lifting force, from one or more sensors, experienced by the watercraft vessel operating in a region of the vortex.

At block 704, the vessel control system can determine, the optimum position in real time based on the relative position, a magnitude of the fluid velocity field, and the lifting force.

And at block 705, the vessel control system can maneuver the watercraft vessel from a first position to an optimum position.

FIG. 8 illustrates another flow chart of an example process for operating a watercraft vessel.

In the example flow diagram 80 of FIG. 8, at block 800, a vessel control system can determine a position signal and a velocity signal of a leading vessel.

At block 801, the vessel control system can detect a relative position, from one or more sensors, of a nearby vessel including the leading vessel or a different trailing vessel from the watercraft vessel.

At block 802, the vessel control system can receive measurements, from one or more sensors, of a fluid velocity field of a vortex created by the leading vessel.

At block 803, the vessel control system can detect a lifting force, from one or more sensors, experienced by the watercraft vessel operating in a region of the vortex.

At block 804, the vessel control system can determine a peak upwash region of the vortex created by the leading vessel.

And at block 805, the vessel control system can maneuver the watercraft vessel to optimum position in real time.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. A method for operating a watercraft vessel having one or more submerged underwater hydrofoils in a body of water, the method comprising:
    determining a location of an actual or predicted underwater vortex created by a hydrofoil of a first vessel, the first vessel hydrofoil being submerged under a surface of the body of water, the hydrofoil capable of creating an underwater vortex having a upwash region;
    identifying an optimum position to maneuver the watercraft vessel such that at least one or more hydrofoils of the watercraft vessel would be positioned in a portion of the upwash region of the underwater vortex; and
    maneuvering the watercraft vessel from a first position to the optimum position.

2. The method of claim 1, wherein maneuvering the watercraft vessel from the first position to the optimum position reduces drag experienced by the watercraft vessel.

3. The method of claim 1, further comprising:
    determining a relative position and velocity of the first vessel.

4. The method of claim 1, further comprising:
    detecting and measuring a fluid velocity field of the underwater vortex around the watercraft vessel.

5. The method of claim 4, further comprising:
    detecting and measuring an efficiency gain from a lifting force experienced by watercraft vessel operating in an upwash region of the underwater vortex.

6. The method of claim 5, wherein the optimum position is determined at least in part on a received position signal and received velocity signal of the first vessel, a determined relative position signal, the measured fluid velocity field, the measured lifting force, or a combination thereof.

7. The method of claim 1, wherein the optimum position is further determined by determining a peak upwash region of the underwater vortex around the watercraft vessel.

8. The method of claim 1, further comprising:
    determining a shape of the underwater vortex about the watercraft vessel.

9. The method of claim 1, further comprising:
    determining a position of the upwash region of the underwater vortex.

10. The system of claim 1, wherein maneuvering the watercraft vessel from the first position to the optimum position reduces drag experienced by the watercraft vessel.

11. The system of claim 1, further comprising:
    determining a relative position and velocity of the first vessel.

12. The system of claim 1, wherein the optimum position is further determined by determining a peak upwash region of the vortex around the watercraft vessel.

13. The system of claim 1, further comprising:
    determining a position of the upwash region of the underwater vortex.

14. A positioning system for determining an underwater vortex about a watercraft vessel, the system configured to perform the operations of:
    determining a location of an actual or predicted underwater vortex created by a hydrofoil of a first vessel, the first vessel hydrofoil being submerged under a surface of the body of water, the hydrofoil capable of creating an underwater vortex having a upwash region;
    identifying an optimum position to maneuver the watercraft vessel such that at least one or more hydrofoils of the watercraft vessel would be positioned in a portion of the upwash region of the underwater vortex; and
    maneuvering the watercraft vessel from a first position to the optimum position.

15. The method of claim 14, wherein the maneuvering of the watercraft vessel from the first position to the optimum position results in an increased lift and reduced drag of the watercraft vessel moving through the body of water.

16. The system of claim 14, further comprising:
    detecting and measuring a fluid velocity field of a vortex around the watercraft vessel.

17. The system of claim 16, further comprising:
    detecting and measuring an efficiency gain from a lifting force experienced by the watercraft vessel operating in an upwash region of the vortex.

18. The system of claim 17, wherein the optimum position is determined at least in part on a received position signal and received velocity signal of the first vessel, a determined relative position signal, the measured fluid velocity field, the measured lifting force, or a combination thereof.

19. The system of claim 14, wherein the maneuvering of the watercraft vessel from the first position to the optimum position results in an increased lift and reduced drag of the watercraft vessel moving through the body of water.

20. The system of claim 14, further comprising:
   determining a shape of the underwater vortex about the watercraft vessel.

\* \* \* \* \*